J.W. & M. Chandler.
Potato Digger.
Nº 48,616. Patented Jul. 4, 1865.
Fig: 1
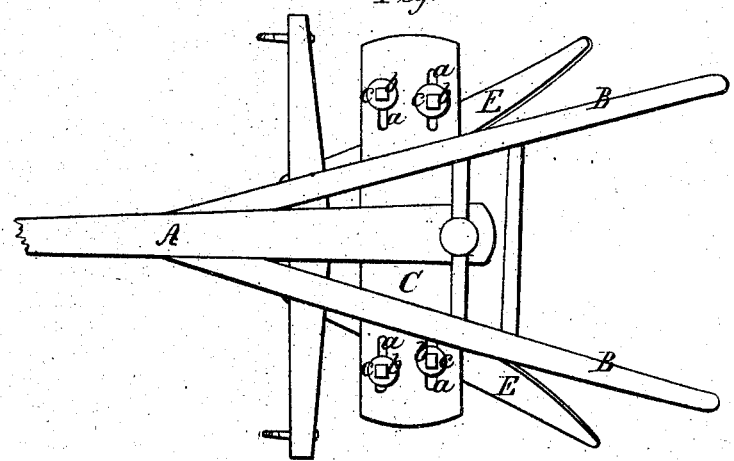
Fig: 2
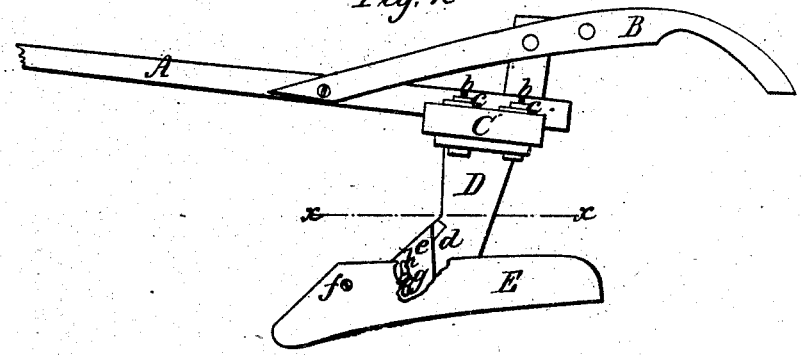
Fig: 3
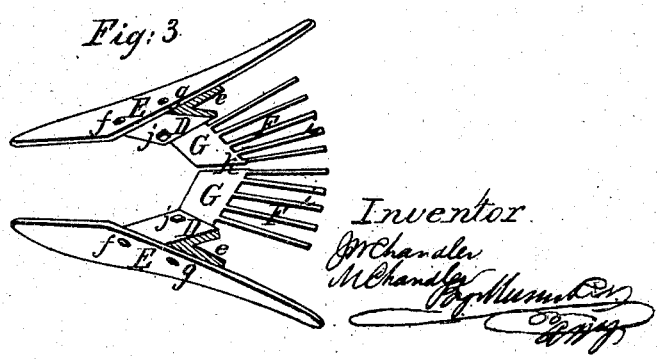
Witnesses
Wm Trewin
Theo Trigel
Inventor
J.W. Chandler
M. Chandler

UNITED STATES PATENT OFFICE.

MOSES CHANDLER AND JOHN W. CHANDLER, OF EAST CORINTH, ASSIGNORS TO THEMSELVES, ANTHONY WOODARD, AND WILSON R. WOODARD, OF BANGOR, MAINE.

IMPROVEMENT IN CULTIVATOR AND POTATO-DIGGER COMBINED.

Specification forming part of Letters Patent No. 48,616, dated July 4, 1865.

*To all whom it may concern:*

Be it known that we, MOSES CHANDLER and JOHN W. CHANDLER, of East Corinth, in the county of Penobscot and State of Maine, have invented a new and Improved Combined Cultivator and Potato-Digger; and we do hereby declare that the following is a full, clear, and exact description thereof, which will enable others skilled in the art to make and use the same, reference being had to the accompanying drawings, forming part of this specification, in which—

Figure 1 is a plan or top view of our invention; Fig. 2, a side view of the same; Fig. 3, a horizontal section of the same, taken in the line $x\ x$, Fig. 2.

Similar letters of reference indicate like parts.

This invention consists in the employment or use of two adjustable blades or cultivators, in connection with a screen and shares, all arranged to operate in the manner hereinafter set forth.

A represents the beam of the implement provided with two handles, B B, and a cross-bar, C at its rear end, the latter having two oblong slots, $a\ a$, made in it longitudinally near each end, as shown in Fig. 1.

D D are two standards, which may be of cast-iron. These standards have screw-rods $b$ at their upper ends which pass up through the slots $a$ in the cross-bar C, and have nuts $c$ on them above the slots for the purpose of securing the standards firmly to the cross-bar. The standards D D at their lower parts project angularly forward, as shown at $d$ in Fig. 2, and these lower parts have oblique flanges $e$ projecting from their outer sides, as shown clearly in Fig. 3, and to these flanges blades or cultivators E are attached, one to each, by pivot-bolts $f$. The shape of the blades or cultivators is shown clearly in Figs. 2 and 3, and they have a flaring or oblique position relatively with each other, as shown in Figs. 1 and 3, the front ends of the blades or cultivators being nearer to each other than the opposite ends. These blades or cultivators may be secured in a more or less inclined or raking position by means of bolts $g$, which pass through them and through curved slots $h$ in the flanges $e$, (see Fig. 2,) and the blades or cultivators may be adjusted at a greater or less distance apart by loosening the nuts $c$ on the rods $b$ of the standards D.

F F represent two screens, which are formed by a series of teeth or fingers $i$ at the rear ends of plates G, which serve as shares. These shares are secured by bolts $j$ to the lower part of the standards D D, and a space, $k$, is allowed between the shares, as shown in Fig. 3. The teeth or fingers $i$ have what may be termed a "fan-like" position, their front edges being the lowest.

The operation is as follows: The implement is drawn along so that the blades or cultivators E E will scrape or take off the sides of the hills or drills, while the shares G and screens F pass under the potatoes in the hills or drills, leaving the potato-tops standing with potatoes attached to them, but loosened from the soil. The space $k$ between the shares G admits of obstructions passing between the shares which might gather upon them.

The chief advantage of this implement is that it digs the potatoes without detaching them from the tops, thereby effecting a great saving of time in gathering the potatoes, as the tops are grasped by the operator and the potatoes shaken off into the basket. Another advantage is that the implement may be used as a cultivator at any time for pulverizing the soil.

We claim as new and desire to secure by Letters Patent—

1. The oblique blades or cultivators E E, in combination with the shares G G and screens F F, all arranged to operate substantially as and for the purpose set forth.

2. The shares G G and screens F F, arranged with a space, $k$, between them to admit of the passage or escape of obstructions from the shares and screens, as set forth.

MOSES CHANDLER.
JOHN W. CHANDLER.

Witnesses:
A. SANBORN,
R. QUIMBY.